(12) United States Patent
Berend et al.

(10) Patent No.: US 7,835,634 B2
(45) Date of Patent: Nov. 16, 2010

(54) CAMERA ENCLOSURE SEALING SYSTEM AND METHOD

(75) Inventors: Cynthia Berend, Brookline, NH (US); Michael Philip Greenberg, Goffstown, NH (US); Thomas J. Driscoll, Mont Vernon, NH (US)

(73) Assignee: Microscan Systems, Inc., Renton, WA (US)

( * ) Notice: Subject to any disclaimer, the term of this patent is extended or adjusted under 35 U.S.C. 154(b) by 186 days.

(21) Appl. No.: 12/144,819

(22) Filed: Jun. 24, 2008

(65) Prior Publication Data

US 2009/0003811 A1 Jan. 1, 2009

Related U.S. Application Data

(60) Provisional application No. 60/946,773, filed on Jun. 28, 2007.

(51) Int. Cl.
*G03B 17/08* (2006.01)
(52) U.S. Cl. .......................................... 396/27; 396/25
(58) Field of Classification Search ................... 396/25, 396/27
See application file for complete search history.

(56) References Cited

U.S. PATENT DOCUMENTS

| | | | | |
|---|---|---|---|---|
| 6,602,089 | B2 * | 8/2003 | Abe et al. | 439/404 |
| 7,534,615 | B2 * | 5/2009 | Havens | 436/3 |
| 7,609,322 | B2 * | 10/2009 | Takada | 348/374 |
| 7,635,834 | B2 * | 12/2009 | Augstein et al. | 250/208.1 |
| 2005/0117022 | A1 | 6/2005 | Marchant | 348/207.11 |
| 2007/0058065 | A1 * | 3/2007 | Saiki | 348/335 |

OTHER PUBLICATIONS

"IP67, What Does That Mean?", 3 pages, copyright 2008, Resource Supply LLC.*

* cited by examiner

*Primary Examiner*—Rodney E Fuller
(74) *Attorney, Agent, or Firm*—Blakely Sokoloff Taylor & Zafman LLP

(57) ABSTRACT

Embodiments of a dust-proof and water-proof enclosure for a camera. The enclosure includes first and second housings joined along a diagonal plane with a sealing element positioned on the diagonal plane between the two housings. An optical assembly is secured to at least one optoelectronic housing, and the optoelectronic housing is secured to a sidewall of the first housing. At least one electrical connector is secured to the sidewall of the second housing that is opposite the sidewall of the first housing to which the optoelectronic housing is secured when the first and second housing are joined.

34 Claims, 3 Drawing Sheets

CAMERA ENCLOSURE SEALING SYSTEM AND METHOD

CROSS-REFERENCE TO RELATED APPLICATION

The instant patent application is related to U.S. Provisional Patent Application Ser. No. 60/946,773, filed on Jun. 28, 2007, titled "Camera Enclosure Sealing System and Method," the disclosure of which is incorporated herein by reference.

FIELD OF THE INVENTION

The present invention relates generally to a sealing system and method. More particularly, the invention encompasses a method and a system for a camera enclosure sealing. The invention meets or exceeds the IP67 International Standard. The inventive camera enclosure sealing system provides an enclosure which is dust-proof and water-proof.

BACKGROUND INFORMATION

Most all of the camera enclosures or camera casings are made for a non-rugged environment. In most cases the electronics consists of an upper and lower board assembly interconnected by a ribbon cable. In addition, there is a frontal optical assembly carrying the CCD image sensor connected by a cable to the bottom board assembly plus wiring for target lasers and integrated lighting when this is required. The camera enclosure or camera casings could also comprise of an upper and lower interlocking extrusion with interposing gaskets plus two machined end assemblies. Each of the end assemblies could be held in place with a plurality of securing devices, such as, for example, screws. To seal this camera enclosure or camera casings one could also use end gaskets.

Another approach to solving this problem has been products which have the lens and sensor at right angles to the electronics boards, such as Cognex (not shown) or DVT(Cognex) (not shown). However, this conventional method does not enable a camera to have the sensor and lens provided in line with the connectors.

Microscan Quadrus (Trademark of Microscan Systems Inc.) (not shown) is a sealed smart camera with a diagonal separation of upper and lower halves of its housing. However, in contrast to the present invention, the separation does not form a plane but curves upwards requiring the use of a cemented in-bead type gasket to achieve a seal.

In order to meet certain rugged environmental conditions the camera enclosures have to meet or exceed the IP standards. IP stands for "Ingress Protection," or "International Protection." An IP number is used to specify the environmental protection of enclosures around electronic equipment. These ratings are determined by specific tests. The IP number is composed of two numbers, the first referring to the protection against solid objects and the second against liquids. Therefore, the higher the number, the better the protection.

| First Number |
| --- |
| 0 No protection (Sometimes X) |
| 1 Protected against solid objects up to 50 mm³ |
| 2 Protected against solid objects up to 12 mm³ |
| 3 Protected against solid objects up to 2.5 mm³ |
| 4 Protected against solid objects up to 1 mm³ |
| 5 Protected against dust, limited ingress (no harmful deposit) |
| 6 Totally protected against dust |

| Second Number |
| --- |
| 0 No protection (Sometimes X) |
| 1 Protection against vertically falling drops of water (e.g. condensation) |
| 2 Protection against direct sprays of water up to 15 degrees from vertical |
| 3 Protection against direct sprays of water up to 60 degrees from vertical |
| 4 Protection against water sprayed from all directions—limited ingress permitted |
| 5 Protected against low pressure jets of water from all directions—limited ingress permitted |
| 6 Protected against low pressure jets of water, limited ingress permitted (e.g. ship deck) |
| 7 Protected against the effect of immersion between 15 cm and 1 m |
| 8 Protected against long periods of immersion under pressure |

Thus, IP67 would mean that the product is "totally protected against dust" and that the product is also "protected against the effect of immersion between 15 cm and 1 m."

US Patent Publication Serial No. 20050117022 (Stephen John Marchant), the disclosure of which is incorporated herein by reference, discloses an image capture and retrieval apparatus includes a camera unit including a high resolution image sensor for capturing data relating to a visual image, a radio transmitter and radio receiver for triggering the image sensor of the camera unit to capture image data at a predetermined time and/or location. The apparatus further includes a base station for retrieving and processing image data and a camera unit including data storage means for transmitting the image data, the moveable unit being adapted for conveying to the base station image data captured by the image center at a location remote from the base station. Also disclosed is that the housing 50 is made of a high impact plastics material, waterproof to a level of IP67. This means the unit is totally protected against dust and can be submersed in water to a depth of between 15 cm and 1 m for 30 minutes without any ingress of water.

Thus, a need exists for a camera enclosure sealing system and method that meets or exceeds an IP67 standard.

This invention overcomes the problems of the prior art and provides a camera enclosure sealing system and method that meets or exceeds an IP67 standard.

PURPOSES AND SUMMARY OF THE INVENTION

The invention is a novel camera enclosure sealing system and method.

Therefore, one purpose of this invention is to provide a novel camera enclosure sealing system and method.

Another purpose of this invention is to provide a camera enclosure sealing system and method where the enclosure provides a dust-proof environment for its contents.

Yet another purpose of this invention is to provide a camera enclosure sealing system and method where the enclosure provides a water-proof environment for its contents.

Still yet another purpose of this invention is to provide a novel camera enclosure sealing system and method that meets or exceeds an IP67 standard.

Therefore, one aspect of this invention comprises a camera enclosure apparatus, comprising:

(a) a first housing, wherein said first housing has a first base, and wherein a base end of a first side wall, a second sidewall, a third sidewall and a fourth sidewall, is connected to said first base to form a first content cavity, and wherein said first sidewall is opposite said third sidewall and wherein said second sidewall is opposite said fourth sidewall such that said second sidewall and said fourth sidewall form a diagonal plane so that said third sidewall is at the bottom of said diagonal plane and said first sidewall is at the top of said diagonal plane;

(b) a second housing, wherein said second housing has a second base, and wherein a base end of a first side wall, a second sidewall, a third sidewall and a fourth sidewall, is connected to said second base to form a second content cavity, and wherein said first sidewall is opposite said third sidewall and wherein said second sidewall is opposite said fourth sidewall such that said second sidewall and said fourth sidewall form a diagonal plane so that said third sidewall is at the bottom of said diagonal plane and said first sidewall is at the top of said diagonal plane;

(c) upper surface of said four sidewalls of said first housing having at least one peripheral groove to accommodate at least one sealing insert;

(d) at least one sealing insert in said peripheral groove in said upper surface of said first housing;

(e) said first housing is secured to said second housing such that said sidewall at the bottom of said diagonal plane in said first housing is mated with said sidewall at the top of said diagonal plane in said second housing, and that said sidewall at the bottom of said diagonal plane in said second housing is mated with said sidewall at the top of said diagonal plane in said first housing, and wherein said first housing is secured to said second housing via a plurality of fastening devices, such that said sealing insert is securely held in place between the upper surface of said four side walls of said first housing and the upper surface of said four side walls of said second housing;

(f) at least one optical assembly secured to at least one optoelectronic housing;

(g) said at least one optoelectronic housing is secured to said sidewall having said top of said diagonal plane in said first housing, such that said at least one optical assembly projects out of the plane of said sidewall; and (h) at least one electronic connector secured to said sidewall having said top of said diagonal plane in said second housing, such that said at least one electronic connector projects out of the plane of said sidewall, and is at the opposite end from said at least one optoelectronic housing, thereby forming said camera enclosure apparatus.

Another aspect this invention comprises a method of forming a camera enclosure sealing, comprising the steps of:

(a) placing a first housing in mating contact with a second housing, wherein said first housing has a first base, and wherein a base end of a first side wall, a second sidewall, a third sidewall and a fourth sidewall, is connected to said first base to form a first content cavity, and wherein said first sidewall is opposite said third sidewall and wherein said second sidewall is opposite said fourth sidewall such that said second sidewall and said fourth sidewall form a diagonal plane so that said third sidewall is at the bottom of said diagonal plane and said first sidewall is at the top of said diagonal plane, and wherein said second housing has a second base, and wherein a base end of a first side wall, a second sidewall, a third sidewall and a fourth sidewall, is connected to said second base to form a second content cavity, and wherein said first sidewall is opposite said third sidewall and wherein said second sidewall is opposite said fourth sidewall such that said second sidewall and said fourth sidewall form a diagonal plane so that said third sidewall is at the bottom of said diagonal plane and said first sidewall is at the top of said diagonal plane; and wherein upper surface of said four sidewalls of said first housing has at least one peripheral groove to accommodate at least one sealing insert;

(b) placing said at least one sealing insert in said peripheral groove in said upper surface of said first housing;

(c) securing first housing to said second housing such that said sidewall at the bottom of said diagonal plane in said first housing is mated with said sidewall at the top of said diagonal plane in said second housing, and that said sidewall at the bottom of said diagonal plane in said second housing is mated with said sidewall at the top of said diagonal plane in said first housing, and wherein said first housing is secured to said second housing via a plurality of fastening devices, such that said sealing insert is securely held in place between the upper surface of said four side walls of said first housing and the upper surface of said four side walls of said second housing;

(d) securing at least one optical assembly to at least one optoelectronic housing;

(e) securing said at least one optoelectronic housing to said sidewall having said top of said diagonal plane in said first housing, such that said at least one optical assembly projects out of the plane of said sidewall; and (f) securing at least one electronic connector to said sidewall having said top of said diagonal plane in said second housing, such that said at least one electronic connector projects out of the plane of said sidewall, and is at the opposite end from said at least one optoelectronic housing, thereby forming said camera enclosure apparatus.

BRIEF DESCRIPTION OF THE DRAWINGS

The features of the invention that are novel and the elements characteristic of the invention are set forth with particularity in the appended claims. The drawings are for illustration purposes only and are not drawn to scale. Furthermore, like numbers represent like features in the drawings. The invention itself, both as to organization and method of operation, may best be understood by reference to the detailed description which follows taken in conjunction with the accompanying drawings in which:

DETAILED DESCRIPTION

The present invention provides a novel packaging technique for smart cameras which are especially designed for severe environments. More specifically, in an embodiment, the present invention relates to a novel design for a smart camera housing required to function in an IP67 (waterproof) environment. In another embodiment, a smart camera provides a sensor and lens in-line with the connectors.

It is preferred that the housing of the present invention is a machined or a molded rectangular shape housing which is divided diagonally to form a flat plane along the diagonal to provide a sealing plane. The shape thus divides the housing into two cavities, one for holding each of the electronics board assemblies. An O-ring gasket seals the upper and lower sections. It is preferred that the lower housing section has an oval-shaped opening for the sealed optical assembly. This optical assembly interface is also sealed with a seal, such as, for example, an O-ring.

The upper half and the lower half could be fastened with fastening devices, such as, for example, screws. The screws when tightened would compress the central O-ring and mate the upper half with the lower half of the enclosure housing. Similarly, the front optical assembly could have fastening devices, such as, for example, screws, to mate the front optical assembly to the lower half of the enclosure housing.

The invention also provides a hermetic seal for a smart camera which when assembled creates a waterproof sealed rectangular prism shape for a smart camera wherein the optical axis is parallel to the axis of the prism.

It is preferred that the lower or bottom assembly carries all image processing components, such as, for example, laser targeting, CCD, facilitating optical alignment and calibration in an open configuration, thus reducing manufacturing labor costs. The system further includes a sealed modular optical interface. It should be appreciated that partitioning of the electronics does not need to be restricted, for example, for some applications all the electronics, except for the imager could be on a single electronic board.

Figure 1:
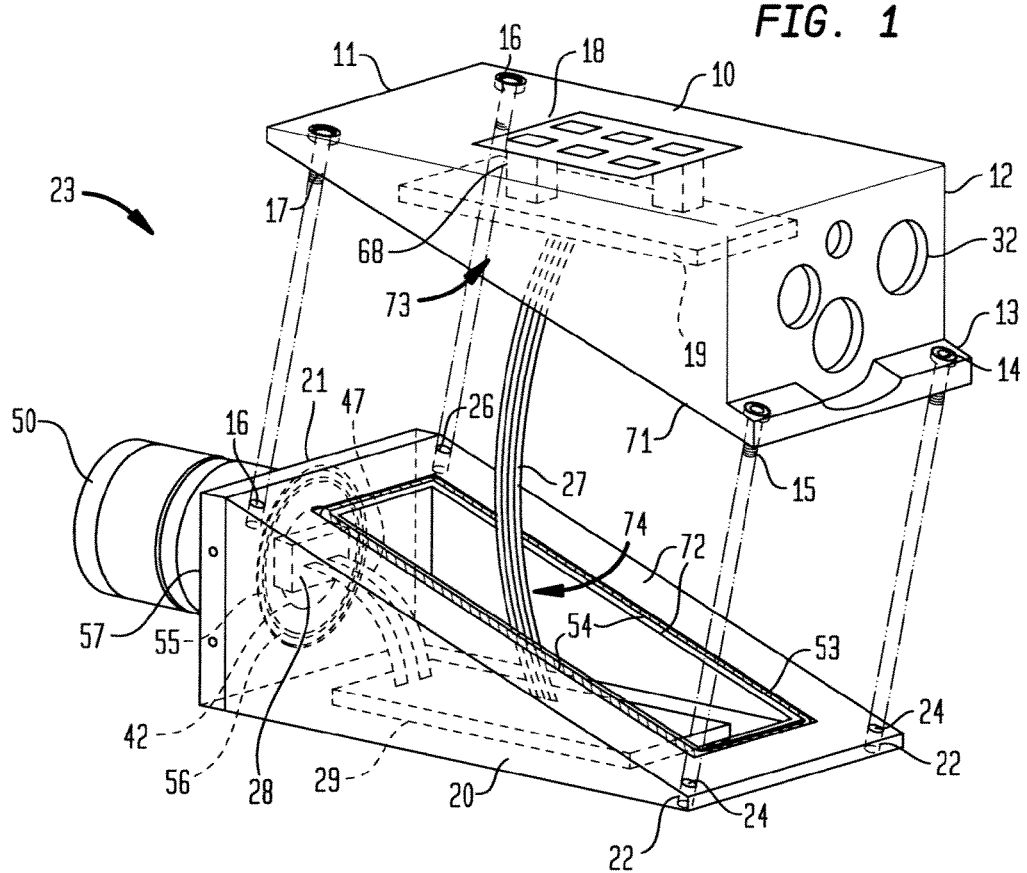
FIG. 1 is an exploded view of an exemplary camera enclosure sealing system which is used to illustrate a first embodiment of the present invention.

FIG. 1 is an exploded view of an exemplary camera enclosure sealing system 23, which is used to illustrate a first embodiment of the present invention. The camera enclosure sealing system 23, has an upper or first housing 10, and a lower or second housing 20. It is preferred that mating surface 71, in the upper housing 10, that mates with mating surface 72, in the lower housing 20, are diagonally shaped as shown in FIG. 1, which creates a diagonally shaped upper or first cavity 73, in the upper housing 10, and a diagonally shaped lower or second cavity 74, in the lower housing 20.

Figure 2:
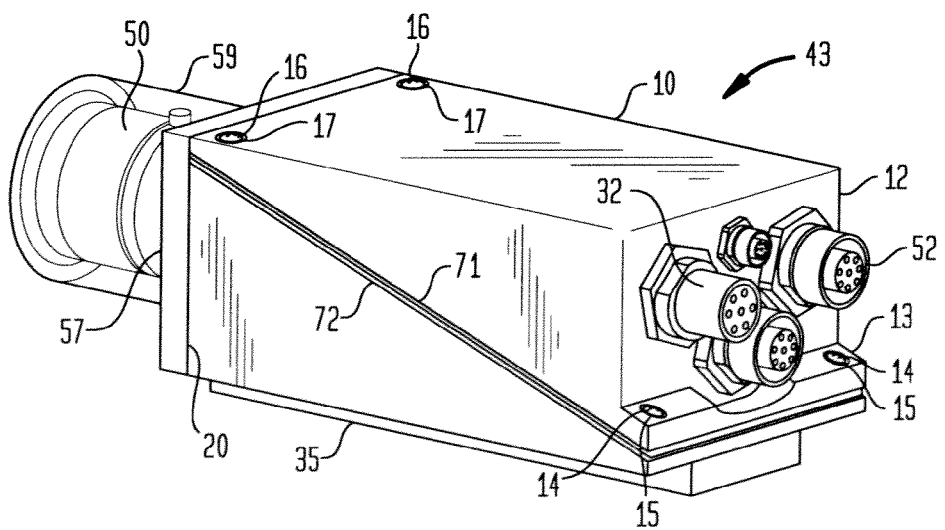
FIG. 2 is a perspective view of an exemplary camera enclosure sealing system which is used to illustrate a second embodiment of the present invention.

The upper housing 10, has a front surface or face 11, and a rear surface or face 12. The upper housing 10, preferably also has a lip area or extension 13, such that, the extension has a plurality of holes or openings 14, to accommodate fastening devices 15, such as, screws 15. The front face 11, preferably has a plurality of holes or openings 16, to accommodate fastening devices 17, such as, screws 17. The rear face 12, has at least one hole or opening 32, to accommodate at least one electronic connector 52, as shown in FIG. 2. It is preferred that the cavity 73, in the upper housing 10, has one or more electronic components 19, which are secured to the upper housing 10, by methods well known in the art. The upper surface of the upper housing 10, could have one or more electronic control devices 18, for the automatic or manual adjustments of the electronic or optical contents of the camera enclosure sealing system 23.

The lower housing 20, has a front surface or face 21, and a rear surface or face 22. The rear surface of the lower housing 20, preferably has a plurality of blind holes or openings 24, to accommodate the fastening devices 15, such as, screws 15. The front face 21, preferably has a plurality of blind holes or openings 26, to accommodate fastening devices 17, such as, screws 17. Lower cavity 74, in the lower housing 20, has one or more electronic components 29. The electronic components 29, are electronically connected to the electronic components 19, via at least one cable 27, such as, a ribbon cable 27. The electronic components 29, securely contained inside the cavity 74, are electronically connected to at least one optoelectronic interface 28, via at least one cable 47, such as, a ribbon cable 47.

For some applications one could apply at least one thermally conductive compliant material, such as, for example, a putty-like compound or a thermally conductive blanket material, between the upper electronic component 19, and the "roof" in the upper housing 10. Similar, at least one thermally conductive compliant material could also be used between the lower electronic component 29 and the "base" of the lower housing 20. The thermally conductive compliant material would not only provide a securing means between the electronic board or component to the housing walls, but also would improve heat dissipation and also lower electronic component temperatures. However, it is preferred to use the split-housing packaging technique as illustrated in the preferred embodiment.

It should be appreciated that the electronic control device 18, could be a label with translucent areas to allow the visibility of any status indicator, such as, for example, LEDs, that may be mounted on the upper surface of electronic component 19, to be visible to a user. The label 18, could be directly applied to the upper surface of the upper housing 10, or one could have a shallow recess on the surface, and one could use at least one sealing adhesive which is capable of achieving the IP67 rating to secure the label 18, to the surface of the upper housing 10. The label 18, could include additional electronic components 18, such as, for example, sealed pushbutton switches, integrated indicator lights, to name a few. These additional electronic components 18, could be connected to the electronic component 19, via at least one cable 68, or similar other such means 68. It is also within the realm of a person skilled in the art to attach similar label 18, or electronic control device 18, to other surfaces of the housing, such as, to the surface of the lower housing 20, and then electronically connecting it to the electronic component 29, using at least one cable 68, or similar such means 68.

An optical assembly 50, containing optoelectronic components (not shown) is attached to the front face 21, via optoelectronic housing 57. The front face 21, has at least one hole or opening 42, to allow for an electronic connection of the optoelectronic interface 28, with the optical assembly 50.

Preferably, the diagonal mating surface 72, in the lower housing 20, has at least one recess or step or channel or groove or blind-hole 54, to accommodate at least one sealing insert 53, such as, for example, a gasket 53, an O-ring 53, to name a few. For some applications the diagonal mating surface 71, in the upper housing 10, could have at least one recess or step or channel or groove or blind-hole (not shown), to accommodate at least one sealing insert 53, or gasket 53, or O-ring 53.

FIG. 2 is a perspective view of an exemplary camera enclosure sealing system 43, which is used to illustrate a second embodiment of the present invention. The camera enclosure sealing system 43, is similar to the camera enclosure sealing system 23, except that the optical assembly 50, is secured inside an optical lens housing 59, in order to provide an additional environmental protection to the optical assembly 50. The camera enclosure sealing system 43, could also have at least one mounting base or device 35. The openings 32, could have one or more electronic connectors 52, at the rear face 12, of the upper housing 10. It is preferred that the optical axis of the optical assembly 50, is parallel to the axis of the prism contained inside the optical assembly 50. It should be appreciated that the optical lens housing 59, is a sealed modular optical interface 59.

Figure 3:
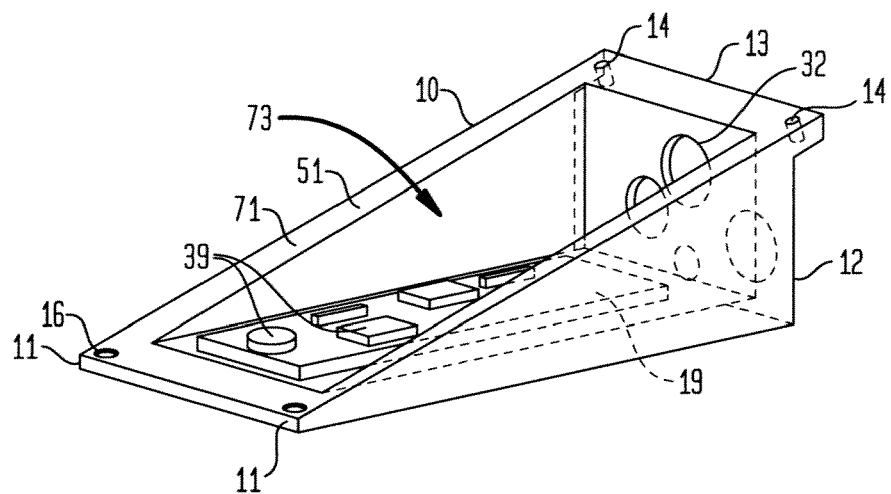
FIG. 3 is an exploded view of an upper housing of an exemplary camera enclosure sealing system which is used to illustrate an embodiment of the present invention.

FIG. 3 is an exploded view of an upper housing 10, of an exemplary camera enclosure sealing system 23, which is used to illustrate an embodiment of the present invention. The electronic component 19, inside the upper cavity 73, could have one or more electronic devices or components 39. The diagonal surface 71, is shown having a flat surface 51, however, the diagonal surface 71, could have at least one recess or step or channel or groove or blind-hole (not shown), to accommodate at least one sealing insert 53, or gasket 53, or O-ring 53.

For most applications it is preferred that only one housing surface (upper surface 71 or lower surface 72) has the recess or groove 54, for the insertion of the sealing insert 53, or gasket 53 or the O-ring 53. Therefore, the second or the opposite surface would be a flat surface 51, and would then compresses the sealing insert 53, or the gasket 53, or the O-ring 53, when the securing means 15 and 17, such as, screws 15 and 17, are tightened. In all situations it is required that the sealing insert 53, or the O-ring 53, or the gasket 53, is above the plane of the mating surface 71 and/or 72, and that the recess or groove 54, has sufficient area to accommodate the compressed sealing insert 53, gasket 53, or O-ring 53, so that a hermetically tight joint is provided to the upper housing 10, and lower housing 20.

Figure 4:
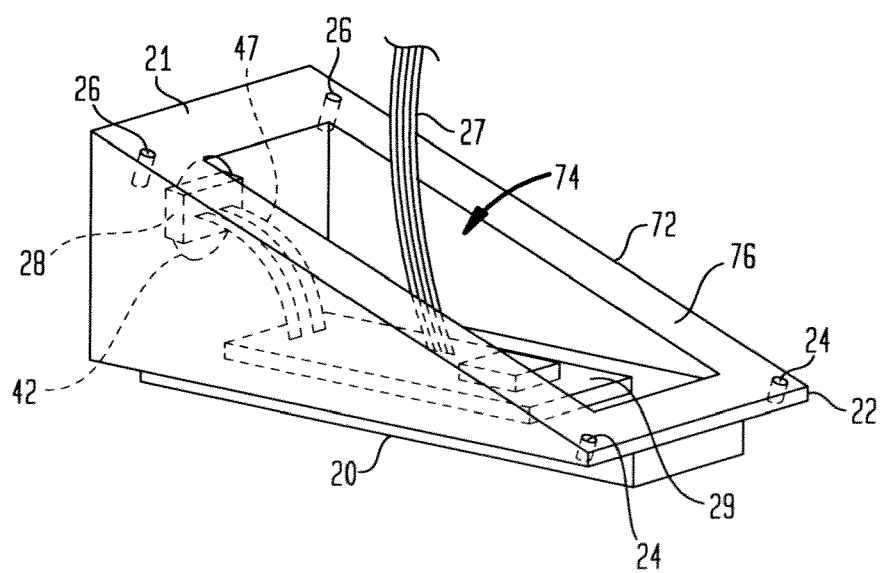
FIG. 4 is an exploded view of a lower housing of an exemplary camera enclosure sealing system which is used to illustrate an embodiment of the present invention.

FIG. 4 is an exploded view of a lower housing 20, of an exemplary camera enclosure sealing system 23, which is used to illustrate an embodiment of the present invention. The diagonal surface 72, in the lower housing 20, as shown has having a flat surface 76. However, for some application the diagonal surface 72, could preferably have at least one recess or step or channel or groove or blind-hole 54, to accommodate at least one sealing insert 53, gasket 53, or O-ring 53, as more clearly shown in FIG. 1. In this embodiment the optoelectronic interface 28, is inside the optoelectronic housing 57, (not shown) and is electronically connected to the electronic components 29, via at least one optical cable 47, such as, a ribbon cable 47, which is passed through at least one opening 42.

It is preferred that the lower or bottom assembly 20, carries the electronic components 29, such as, all the image processing components, such as, for example, laser targeting, CCD, facilitating optical alignment and calibration in an open configuration, thus reducing manufacturing labor costs.

Figure 5:
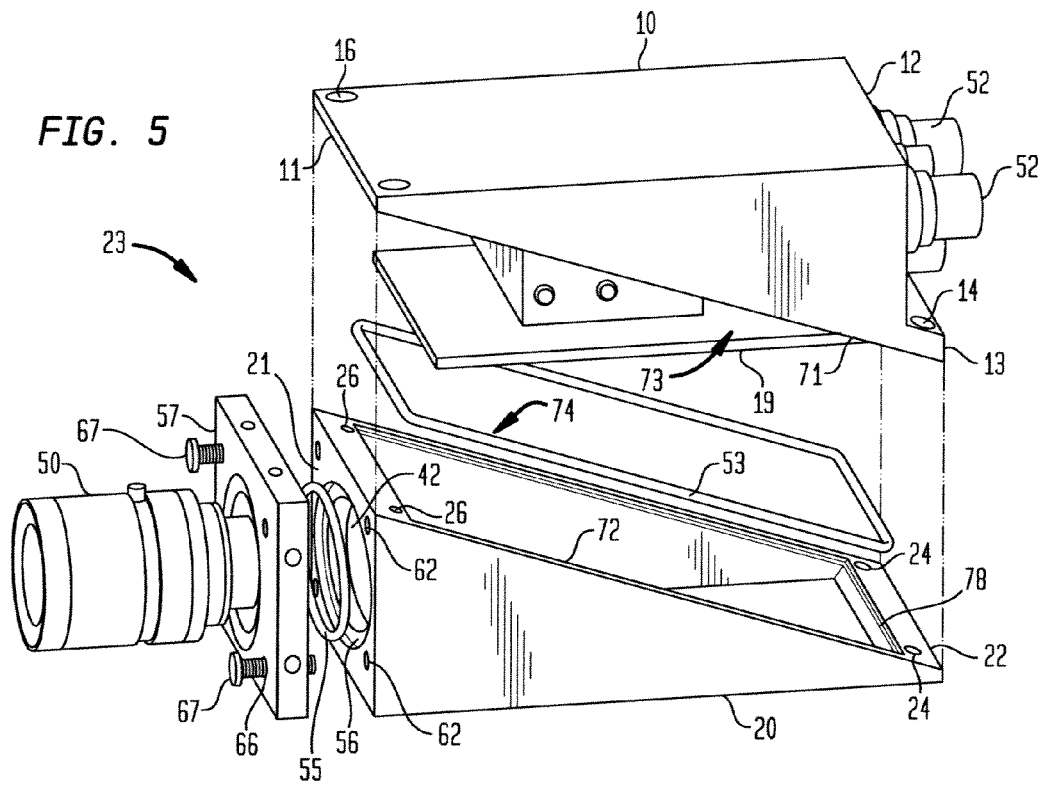
FIG. 5 is an exploded view of an exemplary camera enclosure sealing system which is used to illustrate an embodiment of the present invention.

FIG. 5 is an exploded view of an exemplary camera enclosure sealing system 23, which is used to illustrate an embodiment of the present invention. The exploded view in FIG. 5, is similar to the one shown in FIG. 1, except that the sealing insert 53, or gasket 53, or O-ring 53, is shown separated from at least one step 78, which accommodates the at least one sealing insert 53. However, the diagonal surface 72, could have a flat surface 76, as shown in FIG. 4, or at least one recess or step or channel or groove or blind-hole 54, as shown in FIG. 1. Also, shown in FIG. 5, is at least one optical sealing insert 55, or O-ring 55, or gasket 55, which is secured preferably within at least one recess or step or channel or groove or blind-hole 56, in the optical housing 57. Also shown in FIG. 5, is the hermetic mating of the optical assembly 50, to the face of the lower housing 20. It is preferred that the optoelectronic housing 57, has at least one recess or channel or groove 56, to accommodate at least one gasket or O-ring 55. The optoelectronic housing 57 has a plurality of openings or holes 66, for the passage of fastening devices 67. Preferably, the face of the lower housing 20, has a plurality of blind holes 62, to accommodate the fastening devices 67, that is used to hermetically secure the optoelectronic assembly 50, to the lower housing 20.

Figure 6:
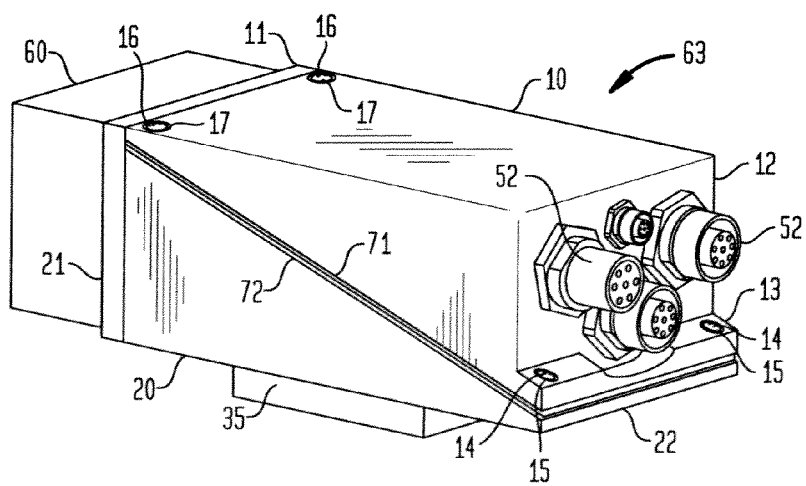
FIG. 6 is a perspective view of an exemplary camera enclosure sealing system which is used to illustrate a third embodiment of the present invention.

FIG. 6 is a perspective view of an exemplary camera enclosure sealing system 63, which is used to illustrate a third embodiment of the present invention. On the front face 21, of the lower housing 20, the camera enclosure sealing system 63, has an optical housing 60, that environmentally seals the optical assembly 50, as well as other optoelectronic components (not shown), such as, for example, an array of LEDs or other lighting components to provide integrated lighting, a compact lens assembly along with the optoelectronic imaging device 28, targeting lasers or other targeting means for allowing the end user to align an object to be inspected with the optical field of view and working focal distance of the imager.

It should be appreciated that the optical housing 60, is a sealed modular optical interface 60.

The fastening device 15, 17 and 67, could be selected from a group consisting of screw, rivet, bolt, to name a few.

Thus, the various embodiments of the present invention will provide hermetic-sealing of housing, and will comply with the IP67 standard of the International Protection (IP) or Ingress Protection (IP) rating system which requires that the housing be dust proof and that the housing prevents the entry of water into the interior cavity 73 and 74, or into the interior of the optical housing 59 and 60, if immersed in room temperature water to a depth of 1 meter for 30 minutes.

It is preferred that the sealing insert 53, and the sealing insert 55, are selected from a group consisting of an O-ring, a gasket, to name a few.

For some applications it may be desirable to have the mating surface 71, and the mating surface 72, be a flat surface, and that a flat sealing insert 53, such as, a flat rubber gasket 53, could be placed between the two mating surfaces 71 and 72, prior to securely sealing the upper housing 10, to the lower housing 20.

As shown in FIGS. 1 through 6, that the mating surface 71, and the mating surface 72, are substantially forming a diagonal plane. This inventive designing of the housing 10 and 20, provides many advantages, such as, for example, the diagonal mating surfaces 71 and 72, allow the attachment of the optical assembly 50, to the front face 21, of the lower housing 20, while the connectors 52, can be securely attached to the back face 12, of the upper housing 10.

This invention further allows the processing of one housing separately from the processing of the second housing, such as, for example, one could bench test the components in the lower housing 20, that has the optical half, while the connectors 52, are being attached to the upper housing 10, or the testing of the electronics secured the upper housing 10.

The formation of the upper housing 10, and lower housing 20, in a prism-shaped halves allows for the formation of a flat diagonal plane where the flat surfaces can be fastened together using various sealing techniques which are designed for mating two planar or flat faces. Another advantage of forming the two housing as a prism-shaped halves is that there is less cost to fabricate because one has fewer or no machining operations required to form compared to complex or curved surfaces.

With this invention one does not need a separate front assembly and a back assembly to support the optics and connectors, as these faces are built into the inventive design. In other words one can build a camera using two parts for the housing rather than four or more parts.

This invention also allows for easy access to the components that are contained inside the upper cavity 73, and lower cavity 74, which is very important for field diagnosis and field repairs. Also, as the upper housing 10, and the lower housing 20, is modular one can inventory each housing separately or swap housing as necessary.

As stated earlier the invention provides a hermetic seal for the smart camera which when assembled creates a waterproof sealed rectangular prism shape for the smart camera as the diagonal surfaces 71 and 72, allow the sealing insert 53, to remain in place and be hermetically wedged-in between the two diagonal surfaces 71 and 72, when the diagonal surfaces 71 and 72, are secured each to the other. One advantage of the prism design for the housing 10 and 20, is that it allows the sealing insert 53, to remain on the surface of the housing 10 and/or 20, due to friction and gravity. It is preferred that the angle of the diagonal surface 71 and/or 72, not be too steep so as to allow the slipping and/or sliding of the sealing insert 53, from the diagonal surface 71 and/or 72.

Another advantage of the two piece diagonal or prism shaped housing 10 and 20, is that it allows each of the components be housing in their respective housing. For example, the electrical connectors are in the upper housing 20, while the optoelectronic components are in the lower housing 10. However, for some applications one could have the electrical connectors in the lower housing 10, while the optoelectronic components are in the upper housing 20.

Another advantage of the two piece diagonal or prism shaped housing 10 and 20, is that it allows the optical axis to be parallel to the axis of the prism. However, for some applications it is preferred that at least a portion of an axis of the at least one optical assembly is parallel to at least a portion of an axis of the at least one electronic connector.

While the present invention has been particularly described in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

What is claimed is:

1. A camera enclosure apparatus, comprising:
   (a) a first housing, wherein said first housing has a first base, and wherein a base end of a first side wall, a second sidewall, a third sidewall and a fourth sidewall, is connected to said first base to form a first content cavity, and wherein said first sidewall is opposite said third sidewall and wherein said second sidewall is opposite said fourth sidewall such that said second sidewall and said fourth sidewall form a diagonal plane so that said third sidewall is at the bottom of said diagonal plane and said first sidewall is at the top of said diagonal plane;
   (b) a second housing, wherein said second housing has a second base, and wherein a base end of a first side wall, a second sidewall, a third sidewall and a fourth sidewall, is connected to said second base to form a second content cavity, and wherein said first sidewall is opposite said third sidewall and wherein said second sidewall is opposite said fourth sidewall such that said second sidewall and said fourth sidewall form a diagonal plane so that said third sidewall is at the bottom of said diagonal plane and said first sidewall is at the top of said diagonal plane;
   (c) upper surface of said four sidewalls of said first housing having at least one peripheral groove to accommodate at least one sealing insert;
   (d) at least one sealing insert in said peripheral groove in said upper surface of said first housing;
   (e) said first housing is secured to said second housing such that said sidewall at the bottom of said diagonal plane in said first housing is mated with said sidewall at the top of said diagonal plane in said second housing, and that said sidewall at the bottom of said diagonal plane in said second housing is mated with said sidewall at the top of said diagonal plane in said first housing, and wherein said first housing is secured to said second housing via a plurality of fastening devices, such that said sealing insert is securely held in place between the upper surface of said four side walls of said first housing and the upper surface of said four side walls of said second housing;
   (f) at least one optical assembly secured to at least one optoelectronic housing;
   (g) said at least one optoelectronic housing is secured to said sidewall having said top of said diagonal plane in said first housing, such that said at least one optical assembly projects out of the plane of said sidewall; and
   (h) at least one electronic connector secured to said sidewall having said top of said diagonal plane in said second housing, such that said at least one electronic connector projects out of the plane of said sidewall, and is at the opposite end from said at least one optoelectronic housing, thereby forming said camera enclosure apparatus, wherein said camera enclosure apparatus provides a water-proof seal to contents in said first cavity and said second cavity, such that ingress of water is prevented when said camera enclosure is immersed in water at room temperature to a depth of about 1 meter for about 30 minutes.

2. The camera enclosure apparatus of claim 1, wherein at least one optical lens housing protects said at least one optical assembly.

3. The camera enclosure apparatus of claim 1, wherein said at least one optoelectronic housing has at least one peripheral groove to accommodate at least one sealing insert 4. The camera enclosure apparatus of claim 1, having at least one sealing insert between said at least one optoelectronic housing and said sidewall of said first housing.

5. The camera enclosure apparatus of claim 1, wherein said first cavity in said first housing contains at least one optoelectronic interfaces and said second cavity in said second housing contains at least one electronic component.

6. The camera enclosure apparatus of claim 1, wherein at least one cable connector electrically connects said at least one optoelectronic interface with said at least one electronic component.

7. The camera enclosure apparatus of claim 1, wherein said fastening device is selected from a group consisting of screw, rivet and bolt.

8. The camera enclosure apparatus of claim 1, wherein said camera enclosure apparatus provides a hermetic seal to contents in said first cavity and said second cavity.

9. The camera enclosure apparatus of claim 1, wherein said camera enclosure apparatus provides a dust-proof seal to contents in said first cavity and said second cavity.

10. The camera enclosure apparatus of claim 1, wherein said camera enclosure apparatus provides a hermetic seal to said optical assembly.

11. The camera enclosure apparatus of claim 1, wherein said camera enclosure apparatus provides a dust-proof seal to said optical assembly.

12. The camera enclosure apparatus of claim 1, wherein said camera enclosure apparatus provides a water-proof seal to said optical assembly, such that ingress of water is prevented when said camera enclosure is immersed in water at room temperature to a depth of about 1 meter for about 30 minutes.

13. The camera enclosure apparatus of claim 1, wherein said sealing insert is selected from a group consisting of an O-ring and gasket.

14. The camera enclosure apparatus of claim 1, wherein said sidewall having said at least one connector further having an extension area, wherein said extension area having at least one opening for passage of a fastening device.

15. The camera enclosure apparatus of claim 1, wherein at least one thermally conductive compliant material secures at least one electronic component inside said camera enclosure apparatus.

16. The camera enclosure apparatus of claim 1, wherein at least a portion of an axis of said at least one optical assembly is parallel to at least a portion of an axis of said at least one electronic connector.

17. A method of forming a camera enclosure sealing, comprising the steps of:
  (a) placing a first housing in mating contact with a second housing, wherein said first housing has a first base, and wherein a base end of a first side wall, a second sidewall, a third sidewall and a fourth sidewall, is connected to said first base to form a first content cavity, and wherein said first sidewall is opposite said third sidewall and wherein said second sidewall is opposite said fourth sidewall such that said second sidewall and said fourth sidewall form a diagonal plane so that said third sidewall is at the bottom of said diagonal plane and said first sidewall is at the top of said diagonal plane, and wherein said second housing has a second base, and wherein a base end of a first side wall, a second sidewall, a third sidewall and a fourth sidewall, is connected to said second base to form a second content cavity, and wherein said first sidewall is opposite said third sidewall and wherein said second sidewall is opposite said fourth sidewall such that said second sidewall and said fourth sidewall form a diagonal plane so that said third sidewall is at the bottom of said diagonal plane and said first sidewall is at the top of said diagonal plane; and wherein upper surface of said four sidewalls of said first housing has at least one peripheral groove to accommodate at least one sealing insert,
  (b) placing said at least one sealing insert in said peripheral groove in said upper surface of said first housing;
  (c) securing first housing to said second housing such that said sidewall at the bottom of said diagonal plane in said first housing is mated with said sidewall at the top of said diagonal plane in said second housing, and that said sidewall at the bottom of said diagonal plane in said second housing is mated with said sidewall at the top of said diagonal plane in said first housing, and wherein said first housing is secured to said second housing via a plurality of fastening devices, such that said sealing insert is securely held in place between the upper surface of said four side walls of said first housing and the upper surface of said four side walls of said second housing:
  (d) securing at least one optical assembly to at least one optoelectronic housing;
  (e) securing said at least one optoelectronic housing to said sidewall having said top of said diagonal plane in said first housing, such that said at least one optical assembly projects out of the plane of said sidewall; and
  (f) securing at least one electronic connector to said sidewall having said top of said diagonal plane in said second housing, such that said at least one electronic connector projects out of the plane of said sidewall, and is at the opposite end from said at least one optoelectronic housing, thereby forming said camera enclosure apparatus, wherein said camera enclosure apparatus provides a water-proof seal to contents in said first cavity and said second cavity, such that ingress of water is prevented when said camera enclosure is immersed in water at room temperature to a depth of about 1 meter for about 30 minutes.

18. The method of forming a camera enclosure sealing of claim 17, wherein at least one optical lens housing protects said at least one optical assembly.

19. The method of forming a camera enclosure sealing of claim 17, wherein said at least one optoelectronic housing has at least one peripheral groove to accommodate at least one sealing insert.

20. The method of forming a camera enclosure sealing of claim 17, having at least one sealing insert between said at least one optoelectronic housing and said sidewall of said first housing.

21. The method of forming a camera enclosure sealing of claim 17, wherein said first cavity in said first housing contains at least one optoelectronic interfaces and said second cavity in said second housing contains at least one electronic component.

22. The method of forming a camera enclosure sealing of claim 17, wherein at least one cable connector electrically connects said at least one optoelectronic interface with said at least one electronic component.

23. Original) The method of forming a camera enclosure sealing of claim 17, wherein said fastening device is selected from a group consisting of screw, rivet and bolt.

24. The method of forming a camera enclosure sealing of claim 17, wherein said camera enclosure apparatus provides a hermetic seal to contents in said first cavity and said second cavity.

25. The method of forming a camera enclosure sealing of claim 17, wherein said camera enclosure apparatus provides a dust-proof seal to contents in said first cavity and said second cavity.

26. The method of forming a camera enclosure sealing of claim 17, wherein said camera enclosure apparatus provides a hermetic seal to said optical assembly.

27. The method of forming a camera enclosure sealing of claim 17, wherein said camera enclosure apparatus provides a dust-proof seal to said optical assembly.

28. The method of forming a camera enclosure sealing of claim 17, wherein said camera enclosure apparatus provides a water-proof seal to said optical assembly, such that ingress of water is prevented when said camera enclosure is immersed in water at room temperature to a depth of about 1 meter for about 30 minutes.

29. The method of forming a camera enclosure sealing of claim 17, wherein said sealing insert is selected from a group consisting of an O-ring and gasket.

30. The method of forming a camera enclosure sealing of claim 17, wherein said sidewall having said at least one connector further having an extension area, wherein said extension area having at least one opening for passage of a fastening device.

31. The method of forming a camera enclosure sealing of claim 17, wherein at least one thermally conductive compliant material securely secures at least one electronic component inside said camera enclosure apparatus.

32. The method of forming a camera enclosure sealing of claim 17, wherein at least a portion of an axis of said at least one optical assembly is parallel to at least a portion of an axis of said at least one electronic connector.

33. A camera enclosure apparatus, comprising:
  (a) a first housing, wherein said first housing has a first base, and wherein a base end of a first side wall, a second sidewall, a third sidewall and a fourth sidewall, is connected to said first base to form a first content cavity, and wherein said first sidewall is opposite said third sidewall and wherein said second sidewall is opposite said fourth sidewall such that said second sidewall and said fourth sidewall form a diagonal plane so that said third sidewall is at the bottom of said diagonal plane and said first sidewall is at the top of said diagonal plane;

(b) a second housing, wherein said second housing has a second base, and wherein a base end of a first side wall, a second sidewall, a third sidewall and a fourth sidewall, is connected to said second base to form a second content cavity, and wherein said first sidewall is opposite said third sidewall and wherein said second sidewall is opposite said fourth sidewall such that said second sidewall and said fourth sidewall form a diagonal plane so that said third sidewall is at the bottom of said diagonal plane and said first sidewall is at the top of said diagonal plane;

(c) upper surface of said four sidewalls of said first housing having at least one peripheral groove to accommodate at least one sealing insert;

(d) at least one sealing insert in said peripheral groove in said upper surface of said first housing;

(e) said first housing is secured to said second housing such that said sidewall at the bottom of said diagonal plane in said first housing is mated with said sidewall at the top of said diagonal plane in said second housing, and that said sidewall at the bottom of said diagonal plane in said second housing is mated with said sidewall at the top of said diagonal plane in said first housing, and wherein said first housing is secured to said second housing via a plurality of fastening devices, such that said sealing insert is securely held in place between the upper surface of said four side walls of said first housing and the upper surface of said four side walls of said second housing;

(f) at least one optical assembly secured to at least one optoelectronic housing;

(g) said at least one optoelectronic housing is secured to said sidewall having said top of said diagonal plane in said first housing, such that said at least one optical assembly projects out of the plane of said sidewall; and (h) at least one electronic connector secured to said sidewall having said top of said diagonal plane in said second housing, such that said at least one electronic connector projects out of the plane of said sidewall, and is at the opposite end from said at least one optoelectronic housing, thereby forming said camera enclosure apparatus, wherein said camera enclosure apparatus provides a water-proof seal to said optical assembly, such that ingress of water is prevented when said camera enclosure is immersed in water at room temperature to a depth of about 1 meter for about 30 minutes.

34. A method of forming a camera enclosure sealing, comprising:

(a) placing a first housing in mating contact with a second housing, wherein said first housing has a first base, and wherein a base end of a first side wall, a second sidewall, a third sidewall and a fourth sidewall, is connected to said first base to form a first content cavity, and wherein said first sidewall is opposite said third sidewall and wherein said second sidewall is opposite said fourth sidewall such that said second sidewall and said fourth sidewall form a diagonal plane so that said third sidewall is at the bottom of said diagonal plane and said first sidewall is at the top of said diagonal plane, and wherein said second housing has a second base, and wherein a base end of a first side wall, a second sidewall, a third sidewall and a fourth sidewall, is connected to said second base to form a second content cavity, and wherein said first sidewall is opposite said third sidewall and wherein said second sidewall is opposite said fourth sidewall such that said second sidewall and said fourth sidewall form a diagonal plane so that said third sidewall is at the bottom of said diagonal plane and said first sidewall is at the top of said diagonal plane; and wherein upper surface of said four sidewalls of said first housing has at least one peripheral groove to accommodate at least one sealing insert, (b) placing said at least one sealing insert in said peripheral groove in said upper surface of said first housing;

(c) securing first housing to said second housing such that said sidewall at the bottom of said diagonal plane in said first housing is mated with said sidewall at the top of said diagonal plane in said second housing, and that said sidewall at the bottom of said diagonal plane in said second housing is mated with said sidewall at the top of said diagonal plane in said first housing, and wherein said first housing is secured to said second housing via a plurality of fastening devices, such that said sealing insert is securely held in place between the upper surface of said four side walls of said first housing and the upper surface of said four side walls of said second housing:

(d) securing at least one optical assembly to at least one optoelectronic housing;

(e) securing said at least one optoelectronic housing to said sidewall having said top of said diagonal plane in said first housing, such that said at least one optical assembly projects out of the plane of said sidewall; and (f) securing at least one electronic connector to said sidewall having said top of said diagonal plane in said second housing, such that said at least one electronic connector projects out of the plane of said sidewall, and is at the opposite end from said at least one optoelectronic housing, thereby forming said camera enclosure apparatus, wherein said camera enclosure apparatus provides a water-proof seal to said optical assembly, such that ingress of water is prevented when said camera enclosure is immersed in water at room temperature to a depth of about 1 meter for about 30 minutes.

* * * * *

UNITED STATES PATENT AND TRADEMARK OFFICE
CERTIFICATE OF CORRECTION

PATENT NO. : 7,835,634 B2  
APPLICATION NO. : 12/144819  
DATED : November 16, 2010  
INVENTOR(S) : Berend et al.

Page 1 of 1

It is certified that error appears in the above-identified patent and that said Letters Patent is hereby corrected as shown below:

In Column 12, line 24, (claim 23, line 1) delete "Original) The" and replace with -- The --.

Signed and Sealed this  
Third Day of May, 2011

David J. Kappos  
*Director of the United States Patent and Trademark Office*